(12) United States Patent
Wang

(10) Patent No.: US 9,740,498 B2
(45) Date of Patent: Aug. 22, 2017

(54) OPPORTUNISTIC MULTI-THREAD METHOD AND PROCESSOR

(71) Applicant: Wuxi DSP Technologies Inc., Wuxi, Jiangsu (CN)

(72) Inventor: Shenghong Wang, Yorktown Heights, NY (US)

(73) Assignee: Wuxi DSP Technologies Inc., Wuxi, Jiangsu Province (CN)

( * ) Notice: Subject to any disclaimer, the term of this patent is extended or adjusted under 35 U.S.C. 154(b) by 556 days.

(21) Appl. No.: 14/357,871

(22) PCT Filed: Nov. 15, 2012

(86) PCT No.: PCT/CN2012/084686
§ 371 (c)(1),
(2) Date: May 13, 2014

(87) PCT Pub. No.: WO2013/071874
PCT Pub. Date: May 23, 2013

(65) Prior Publication Data
US 2014/0351568 A1 Nov. 27, 2014

(30) Foreign Application Priority Data

Nov. 15, 2011 (CN) .......................... 2011 1 0361140

(51) Int. Cl.
*G06F 9/38* (2006.01)

(52) U.S. Cl.
CPC .......... *G06F 9/3867* (2013.01); *G06F 9/3851* (2013.01)

(58) Field of Classification Search
CPC .................................................... G06F 9/3851
(Continued)

(56) References Cited

U.S. PATENT DOCUMENTS 5,303,356 A 4/1994 Vassiliadis et al.
5,392,393 A 2/1995 Deering
(Continued)

FOREIGN PATENT DOCUMENTS

CN 1711563 A 12/2005
CN 1963802 A 5/2007
(Continued)

OTHER PUBLICATIONS

International Search Report for PCT/CN2012/084686 dated Jan. 31, 2013, 2 pages.
(Continued)

*Primary Examiner* — Andrew Caldwell
*Assistant Examiner* — Michael Metzger
(74) *Attorney, Agent, or Firm* — Lowenstein Sandler LLP

(57) ABSTRACT

Disclosed are an opportunistic multi-thread method and processor, the method comprising the following steps: if a zeroth thread, a first thread, a second thread and a third thread all have instructions ready to be executed, then a zeroth clock period, a first clock period, a second clock period and a third clock period are respectively allocated to the zeroth thread, the first thread, the second thread and the third thread; if one of the threads cannot issue an instruction within a specified clock period because the instruction is not ready, and the previous thread still has an instruction ready to be executed after issuing certain instructions in the previous specified clock period, then the previous thread will take the specified clock period. The processor comprises an instruction cache, an instruction decoder, an instruction pipeline controller and an arithmetic logic unit; the opportunistic multi-thread processor adds for each stage of production line a prediction circuit for an effective thread instruction and a set of two-dimensional thread identity registers.

17 Claims, 2 Drawing Sheets

(58) Field of Classification Search
USPC .......................................................... 712/214
See application file for complete search history.

(56) References Cited

U.S. PATENT DOCUMENTS

| | | | |
|---|---|---|---|
| 5,500,942 A | 3/1996 | Eickemeyer et al. | |
| 5,560,028 A | 9/1996 | Sachs et al. | |
| 5,974,534 A | 10/1999 | Noordeen et al. | |
| 6,047,323 A | 4/2000 | Krause | |
| 6,138,230 A | 10/2000 | Hervin et al. | |
| 6,260,189 B1 | 7/2001 | Batten et al. | |
| 6,842,848 B2 | 1/2005 | Hokenek et al. | |
| 6,928,645 B2 | 8/2005 | Wang et al. | |
| 7,343,474 B1* | 3/2008 | Jordan | G06F 9/3802 712/214 |
| 7,543,132 B1 | 6/2009 | Grohoski et al. | |
| 7,676,660 B2* | 3/2010 | Kissell | G06F 8/4442 712/220 |
| 7,725,697 B2 | 5/2010 | Kissell | |
| 7,861,061 B2 | 12/2010 | Hussain | |
| 8,230,430 B2 | 7/2012 | Accapadi et al. | |
| 8,499,299 B1 | 7/2013 | Jakab et al. | |
| 8,612,986 B2 | 12/2013 | Accapadi et al. | |
| 2002/0091915 A1 | 7/2002 | Parady | |
| 2002/0144083 A1* | 10/2002 | Wang | G06F 9/30072 712/23 |
| 2004/0054880 A1 | 3/2004 | Bernstein et al. | |
| 2004/0073781 A1 | 4/2004 | Hokenek | |
| 2005/0138328 A1* | 6/2005 | Moy | G06F 9/3851 712/205 |
| 2006/0095729 A1* | 5/2006 | Hokenek | G06F 9/3851 712/214 |
| 2006/0130062 A1 | 6/2006 | Burdick et al. | |
| 2006/0179284 A1* | 8/2006 | Jensen | G06F 9/30079 712/219 |
| 2007/0076479 A1 | 4/2007 | Kim et al. | |
| 2007/0204137 A1* | 8/2007 | Tran | G06F 9/30181 712/214 |
| 2008/0126766 A1 | 5/2008 | Chheda et al. | |
| 2008/0270749 A1* | 10/2008 | Ozer | G06F 9/3822 712/23 |
| 2009/0113181 A1* | 4/2009 | Comparan | G06F 9/3885 712/215 |
| 2013/0241595 A1 | 9/2013 | Kelem et al. | |

FOREIGN PATENT DOCUMENTS

| | | |
|---|---|---|
| CN | 101526895 A | 9/2009 |
| CN | 102495726 A | 6/2012 |
| EP | 1555610 | 7/2005 |
| WO | WO0146827 | 6/2001 |
| WO | WO2009022294 | 2/2009 |
| WO | WO2013071874 | 11/2011 |

OTHER PUBLICATIONS

EP Search Report dated Apr. 29, 2015—6 pages.
PCT Search Report for PCT/US2015/014272 Dated May 11, 2015, 2 pages.
PCT Search report for PCT/US2015/014064 Dated May 11, 2015, 2 pages.
PCT Search report for PCT/US2015/014270 Dated May 14, 2015, 2 pages.
M. Moudgill, J. Glossner, S. Agrawal, and G. Nacer, "The Sandblaster 2.0 Architecture and SB3500 Implementation," in Proceedings of the Software Defined Radio Technical Forum (SDR Forum '08), Washington DC, Oct. 2008.
Organization of Computer Systems: Processor & Datapath, pp. 1-24, Retrieved Sep. 29, 2015.
Shen et al.; Modern Processor Design: Fundamentals of Superscalar Processors; Beta ed.; Boston: McGraw Hill; Nov. 22, 2002; 498 pages.

* cited by examiner

OPPORTUNISTIC MULTI-THREAD METHOD AND PROCESSOR

FIELD OF THE INVENTION

The present invention relates to multi-threading processor techniques, in particular to an opportunity-driven multi-threading method and a processor that utilizes the method.

BACKGROUND OF THE INVENTION

Multi-threading parallel processing techniques are widely applied in the design of high-performance processors to reduce the impact of waiting cycles during instruction execution of high-speed processors and thereby improve the performance and operating efficiency of the processors. The most commonly used multi-threading technique is simultaneous multi-threading (SMT). For example, Intel's Hyper-Threading, IBM's POWER5, Sun Microsystems' UltraSPARC T2 and MIPS MT all employ the SMT technique.

With the SMT technique, not only are a separate set of registers required for instruction execution for each thread, but also thread tracking logic has to be added causing increased sizes of shared resources, such as instruction caches and TLBs, etc. The thread tracking logic not only keeps track of the progress of the thread but also checks whether the execution of the thread has been completed. Since a large number of threads that are in an execution state or semi-execution state may exist, the sizes of the caches and TLBs of the CPU must be large enough to avoid unwanted thrashing among the threads.

Though the SMT technique can improve the operational capability of the processor, it is difficult to use in the design of embedded processors and low-power processors, because it results in significantly increased complexity of the hardware.

To overcome the complexity of SMT multi-threading control circuits and to reduce power consumption, a simplified time-sharing multi-threaded technique has been used. The time-shared multi-threading technique means that only one thread can operate in a specific instruction cycle. It can be categorized into block multi-threading and interleaved multi-threading. The block multi-threading technique is usually used for low-performance processors such as micro-controllers because its contribution to the improvement of operating efficiency of the processor is very limited. The interleaved multi-threading technique has been applied to some extent to high-performance and low-power processors. Its control circuit is simple but it can attain higher operational capability and efficiency than those of single-thread processors. In the interleaved multi-threading technique, a representative technique is token triggered multi-threading technique.

The token triggered interleaved multi-threading technique has the following features:
(1) It is a time-shared execution process. Each thread is executed in the clock cycles granted to the thread. Only one thread can issue instructions in a specific clock cycle.
(2) After a thread is executed, it will indicate which thread should be started in the next cycle. This approach greatly simplifies hardware selection for threads.
(3) The hardware ensures that each thread is provided with the same instruction execution time.
(4) The operation result can be obtained within specified cycles. Therefore, the instructions do not have to use dependency checking and bypass hardware.

FIG. 1 shows a timing sequence diagram of multi-threaded execution of a four-thread token triggered multi-threading mechanism.

The Token triggered multi-threading technique has a great contribution to simplification of the multi-threading hardware structure and reduction of power consumption, but causes degraded operating efficiency of the operating units of the processor, especially the processing efficiency for a single thread; consequently, the processing capacity of the processor is much lower than that of a processor that employs SMT technique.

The token triggered multi-threading structure of Sandblaster 2.0 has the following drawbacks:

1. The time-shared sequential execution strategy employed for preventing mutual interference among threads and simplifying hardware structures causes degraded operating efficiency of the clock cycle and degraded processing capacity for a single thread. For example, in case a thread $T_1$ has to get an instruction from an external storage device because the current instruction is missed, the thread $T_1$ may not be able to get an instruction in a timely manner since the external storage has a lower operating speed; meanwhile, a thread $T_0$ has an instruction to be executed; however, the clock cycle $C_1$ can only be used by the thread $T_1$ owing to structural constraints; in that case, the clock cycle $C_1$ is wasted.

2. To avoid thrashing among threads and simplify the tracking circuits, Sandblaster 2.0 is designed in a way that each thread has a separate instruction cache. The instruction caches cannot be shared among the threads, resulting in a significant waste of the memory resource.

DISCLOSURE OF THE INVENTION

Technical Problem

The object of the present invention is to provide an opportunity-driven multi-threading processor that utilizes the method to overcome the drawbacks in the prior art.

SOLUTION TO THE PROBLEM

Technical Solution

To attain the objective described above, the present invention employs the following technical solution:

An opportunity-driven multi-threading method, utilizing a zeroth thread, a first thread, a second thread, and a third thread, as well as a zeroth clock cycle, a first clock cycle, a second clock cycle, and a third clock cycle, comprising the following steps:
1. assigning the zeroth clock cycle, first clock cycle, second clock cycle, and third clock cycle fixed to the zeroth thread, first thread, second thread, and third thread, if all of the zeroth thread, first thread, second thread, and third thread have instructions ready and valid for execution;
2. Occupying the specified clock cycle, by the previous thread, if one of the threads can not issue any instruction within the specified clock cycle because the instruction is not ready or valid, and the previous thread still has instructions ready and valid for execution after it issued an instruction in the previous clock cycle.

A processor that utilizes the opportunity-driven multi-threading method, comprising an instruction cache (I-Cache),
an instruction decoder (I-Decoder), an instruction stream controller (Branch) and arithmetic logic units (ALUs), wherein, each thread has a separate set of registers required for instruction execution, and, on that basis, a thread instruction validity prediction circuit is added, and a thread tracking logic or thread identification circuit is added for the pipeline at each level;

In the opportunity-driven multi-threading method, a thread instruction validity prediction circuit is added, and a set of two-dimensional thread identity registers are added for the pipeline at each level.

The instruction validity prediction circuit is designed to predict whether the thread set for the clock cycle has instructions to be executed or whether the instructions are valid, and grant the clock cycle to the current thread if the instructions are invalid.

The set of two-dimensional thread identity (ID) registers are designed to keep track of the execution of the instructions of the thread in the pipeline at each level, to ensure the result data will not be mixed up.

The process can be expanded to include n threads and n clock cycles, where, n is a natural number greater than 1.

In the present invention, the start cycle of execution of each thread is no longer fixed; if a thread does not have any instruction ready and valid for execution within a clock cycle assigned to the thread for the instruction is missed, but the previous thread still has instructions ready and valid for execution, the previous thread can occupy the clock cycle of the current thread; for every thread, the number of clock cycles required for execution still remains unchanged, no matter in which clock cycle the thread is started; to avoid thrashing among the threads, each thread is assigned with a two-dimensional ID.

BRIEF DESCRIPTION OF THE DRAWINGS

Description of the Drawings

Figure 1:
Figure 2:
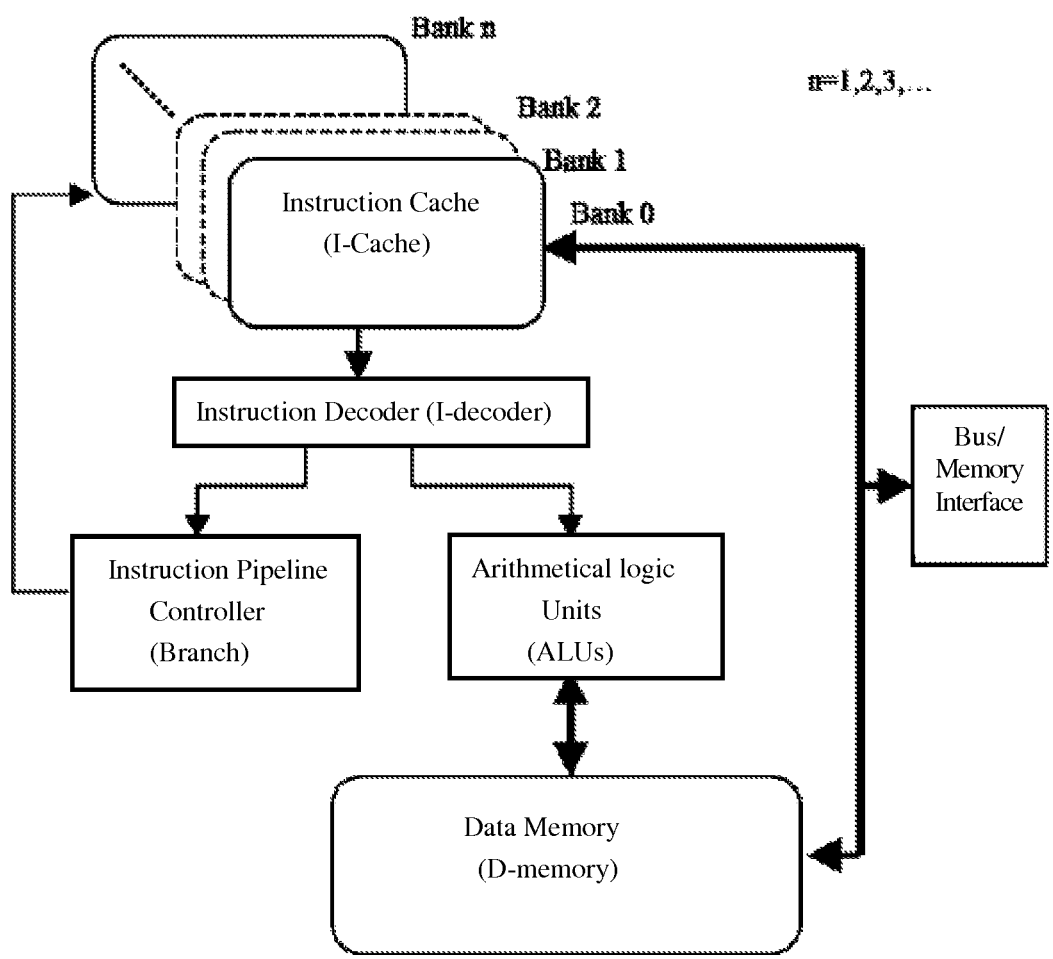
Figure 3:
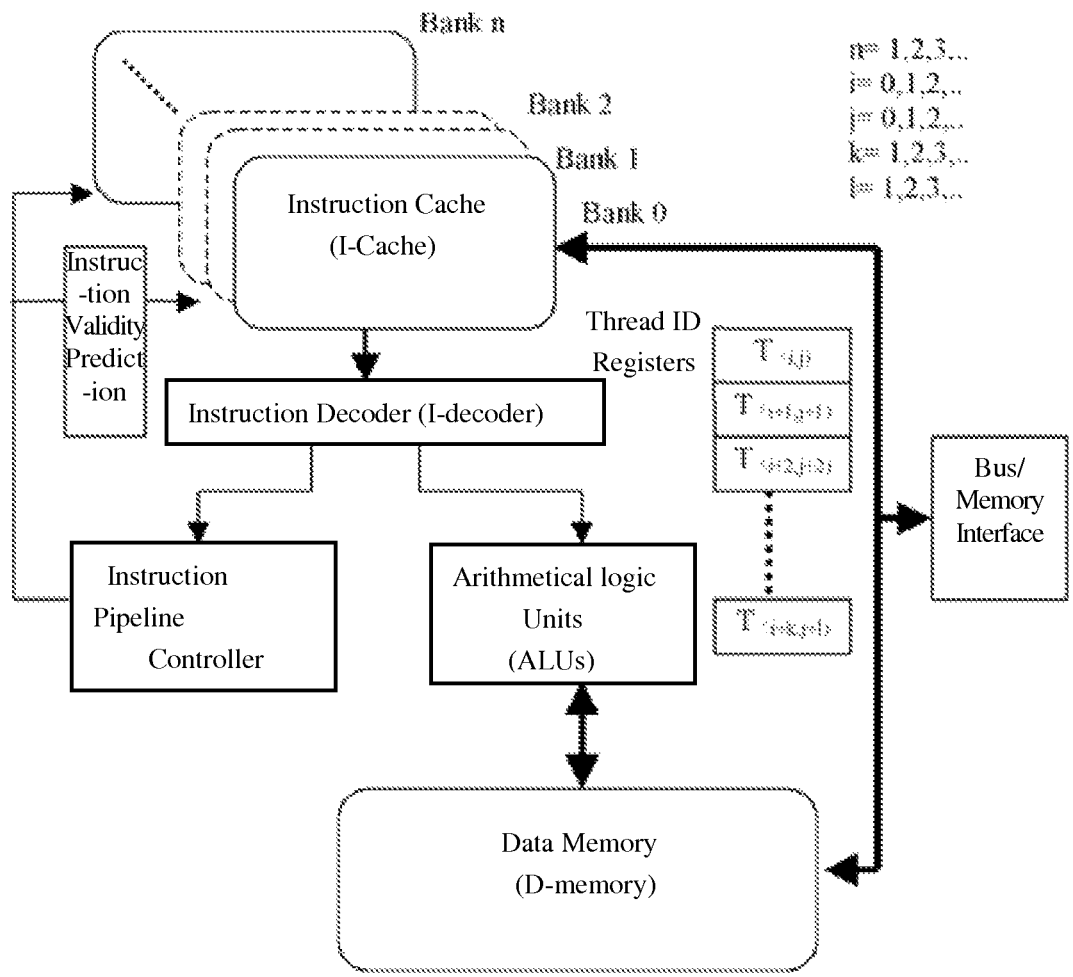
Figure 4:
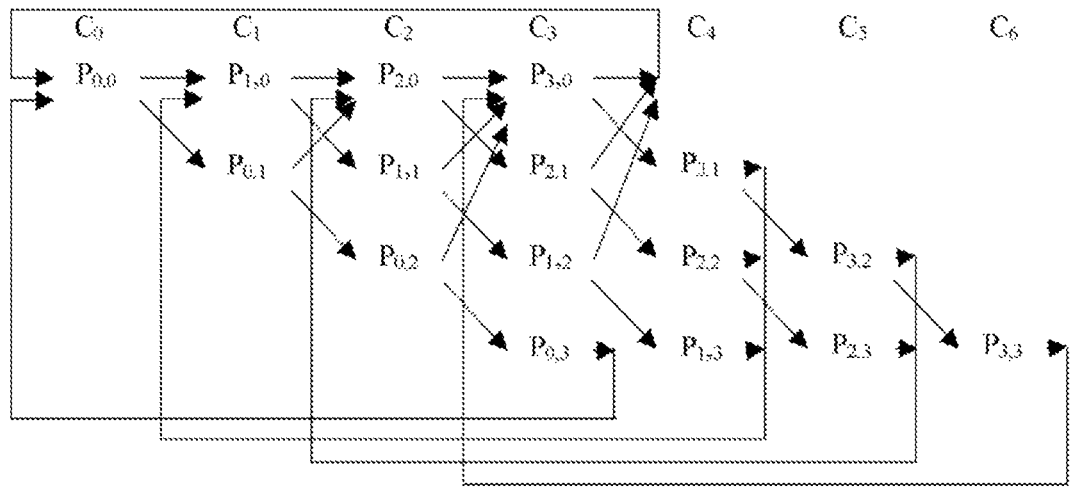

FIG. 1 is a timing sequence diagram of token triggered multi-threading technique;

FIG. 2 shows a typical processor in HARVARD architecture;

FIG. 3 is a structure diagram of an opportunity-driven multi-threading processor;

FIG. 4 is a timing sequence diagram of opportunity-driven multi-threading technique.

PREFERRED EMBODIMENTS OF THE PRESENT INVENTION

Detailed Description of the Preferred Embodiments

FIG. 2 shows a typical Harvard architecture processor comprising an instruction cache (I-Cache), an instruction decoder (I-Decoder), an instruction stream controller (Branch), and arithmetic logic units (ALUs). In a multi-threaded processor, a separate set of registers is usually required for instruction execution and has to be provided for each thread, and a thread tracking logic or thread identification circuit has to be added for the pipeline at each stage, depending on the technique that is used.

In the opportunity-driven multi-threading processor structure, a separate set of registers for instruction execution is provided for each thread on the basis of the typical processor structure, and a thread instruction validity prediction circuit and a set of two-dimensional thread identity registers are added for the pipeline at each stage. A logic block diagram is shown in FIG. 3. The instruction validity prediction circuit is designed to predict whether the thread instructions set for the next clock cycle are valid. If the instructions are invalid, the clock cycle will be granted to the current thread.

The set of two-dimensional thread identity (ID) registers are designed to keep track of the execution of the instructions of the thread in the pipeline at each stage, to ensure the resultant data will not be mixed up.

The working principle of the opportunity-driven multi-threading technique is as follows:

1. If all threads $P_0$, $P_1$, $P_2$, and $P_3$ have instructions ready and valid for execution, the clock cycles $C_0$, $C_1$, $C_2$, and $C_3$ will be assigned respectively to the threads $P_0$, $P_1$, $P_2$, and $P_3$.

2. If one of the threads, e.g., $T_1$ cannot issue any instruction within a specified clock cycle because the instruction is not ready (missed), but thread $T_0$ still has instructions ready and valid for execution after it issued an instruction in clock cycle $C_0$, $P_0$ can occupy the clock cycle $C_1$. To avoid thrashing resulting from the same thread issuing instructions in different clock cycles, every thread is named by means of a two-dimensional nomenclature in the opportunity-driven multi-threading technique. That is to say, $P_0$ issues an instruction $P_{0,0}$ in the clock cycle $C_0$, and issues an instruction $P_{0,1}$ in the clock cycle $C_1$; likewise, if the thread $P_2$ does not have any instruction to be executed within the clock cycle $C_2$ but $T_1$ has an instruction ready and valid for execution, $P_1$ can occupy the clock cycle $C_2$. Accordingly, the instruction issued by the thread $P_1$ in the clock cycle $C_2$ is named as $P_{1,2}$.

FIG. 4 is a control flow diagram of a 4-thread and 4-level pipeline opportunity-driven multi-threading mechanism. In the figure, $C_i$ represents the number of clock cycles, and $P_{ij}$ represents thread ID.

The invention claimed is:

1. An opportunity-driven multi-threading method comprising:
associating an $n^{th}$ thread in a total number (M) of sequentially-executing threads with a corresponding $n^{th}$ clock cycle in a sequence of M clock cycles;
determining, by a thread instruction validity circuit of a processor, whether the $n^{th}$ thread comprises a first instruction waiting to be issued in the $n^{th}$ clock cycle, wherein determining further comprises tracking, using a plurality of two-dimensional thread identity registers associated with each stage of an instruction execution pipeline of the processor, a first identifier of a thread comprising at least one instruction and a second identifier of a clock cycle in which the at least one instruction is to be issued; and
responsive to determining that the $n^{th}$ thread does not include any instruction waiting to be issued in the $n^{th}$ clock cycle, issuing, in the $n^{th}$ clock cycle, a second instruction of a $k^{th}$ thread, wherein the second instruction is waiting to be issued in a $k^{th}$ clock cycle, and wherein the $k^{th}$ clock cycle is before the $n^{th}$ clock cycle in the sequence of M clock cycles.

2. The opportunity-driven multi-threading method of claim 1, further comprising:
responsive to determining that the $n^{th}$ thread comprises the first instruction waiting to be issued, issuing the first instruction in the $n^{th}$ clock cycle.

3. The opportunity-driven multi-threading method of claim 1, wherein determining whether the $n^{th}$ thread comprises the first instruction waiting to be issued in the $n^{th}$ clock cycle further comprises determining, in $(n-1)^{th}$ clock cycle, whether the $n^{th}$ thread comprises the first instruction waiting to be issued in the $n^{th}$ clock cycle.

4. The opportunity-driven multi-threading method of claim 1, wherein the sequentially-executing threads comprise round-robin, sequentially-executing threads comprising: a first thread assigned to issue instructions in a first clock cycle, a second thread assigned to issue instructions in a second clock cycle, a third thread assigned to issue instructions in a third clock cycle, and a fourth thread assigned to issue instructions in a fourth clock cycle.

5. The opportunity-driven multi-threading method of claim 1, wherein the $k^{th}$ clock cycle is prior to and adjacent to the $n^{th}$ clock cycle.

6. The opportunity-driven multi-threading method of claim 1, wherein each one of the M threads is associated with a respective set of registers for issuing instructions, and wherein a plurality of two-dimensional thread identity registers associated with the processor are to track an identifier of a thread comprising an instruction and an identifier of a clock cycle in which the instruction is issued.

7. The opportunity-driven multi-threading method of claim 1, wherein the total number (M) is greater than one (1), and n and k are index values smaller than M.

8. The opportunity-driven multi-threading method of claim 1, wherein an instruction validity prediction circuit associated with the processor is to determine whether the $n^{th}$ thread comprises a first instruction waiting to be issued in the $n^{th}$ clock cycle.

9. The opportunity-driven multi-threading method of claim 1, further comprising:
   determining whether $(n+1)^{th}$ thread comprises a third instruction waiting to be issued in $(n+1)^{th}$ clock cycle; and
   responsive to determining that the $(n+1)^{th}$ thread does not include any instruction waiting to be issued in the $(n+1)^{th}$ clock cycle, issuing, in the $(n+1)^{th}$ clock cycle, a third instruction of the $k^{th}$ thread waiting to be issued in the $k^{th}$ clock cycle.

10. An opportunity-driven multi-threading processor, comprising:
   a total number (M) of sequentially-executing threads; and
   a thread instruction validity prediction circuit to:
      associate an $n^{th}$ thread in the M sequentially-executing threads with a corresponding $n^{th}$ clock cycle in a sequence of M clock cycles, wherein determining further comprises tracking, using a plurality of two-dimensional thread identity registers associated with each stage of an instruction execution pipeline of the processor, a first identifier of a thread comprising at least one instruction and a second identifier of a clock cycle in which the at least one instruction is to be issued;
      determine whether the $n^{th}$ thread comprises a first instruction waiting to be issued in the $n^{th}$ clock cycle; and
      responsive to determining that the $n^{th}$ thread does not include any instruction waiting to be issued in the $n^{th}$ clock cycle, issue, in the $n^{th}$ clock cycle, a second instruction of a $k^{th}$ thread, wherein the second instruction is waiting to be issued in a $k^{th}$ clock cycle, and wherein the $k^{th}$ clock cycle is prior to the $n^{th}$ clock cycle in the sequence of M clock cycles.

11. The opportunity-driven multi-threading processor of claim 10, wherein, responsive to determining that the $n^{th}$ thread comprises the first instruction waiting to be issued, the thread instruction validity prediction circuit is further to issue the first instruction in the $n^{th}$ clock cycle.

12. The opportunity-driven multi-threading processor of claim 10, wherein to determine whether the $n^{th}$ thread comprises the first instruction waiting to be issued in the $n^{th}$ clock cycle, the thread instruction validity prediction circuit if further to determine, in $(n-1)^{th}$ clock cycle, whether the $n^{th}$ thread comprises the first instruction waiting to be issued in the $n^{th}$ clock cycle.

13. The opportunity-driven multi-threading processor of claim 10, wherein the sequentially-executing threads comprise round-robin, sequentially-executing threads comprising: a first thread assigned to issue instructions in a first clock cycle, a second thread assigned to issue instructions in a second clock cycle, a third thread assigned to issue instructions in a third clock cycle, and a fourth thread assigned to issue instructions in a fourth clock cycle.

14. The opportunity-driven multi-threading processor of claim 10, wherein the $k^{th}$ clock cycle is prior to and adjacent to the $n^{th}$ clock cycle.

15. The opportunity-driven multi-threading processor of claim 10, further comprises a plurality of two-dimensional thread identity registers to track an identifier of a thread comprising an instruction and an identifier of a clock cycle in which the instruction is issued, and wherein each one of the M threads is associated with a respective set of registers for issuing instructions.

16. The opportunity-driven multi-threading processor of claim 10, wherein the total number (M) is greater than one (1), and n and k are index values smaller than M.

17. The opportunity-driven multi-threading processor of claim 10, wherein the thread instruction validity prediction circuit is further to:
   determine whether $(n+1)^{th}$ thread comprises a third instruction waiting to be issued in $(n+1)^{th}$ clock cycle; and
   responsive to determining that the $(n+1)^{th}$ thread does not include any instruction waiting to be issued in the $(n+1)^{th}$ clock cycle, issue, in the $(n+1)^{th}$ clock cycle, a third instruction of the $k^{th}$ thread waiting to be issued in the $k^{th}$ clock cycle.

* * * * *